US005850049A

United States Patent [19]

Kamiya

[11] Patent Number: 5,850,049

[45] Date of Patent: Dec. 15, 1998

[54] MUSICAL TONE-GENERATING METHOD AND APPARATUS USING DATA INTERPOLATION

[75] Inventor: Ryo Kamiya, Hamamatsu, Japan

[73] Assignee: Yamaha Corporation, Hamamatsu, Japan

[21] Appl. No.: 768,984

[22] Filed: Dec. 17, 1996

[30] Foreign Application Priority Data

Dec. 21, 1995 [JP] Japan .................................... 7-349044

[51] Int. Cl.[6] ................................ G06F 7/38; G10H 7/12

[52] U.S. Cl. ............................................ 84/607; 364/723

[58] Field of Search ..................... 84/603–607, 622–625, 84/659–661; 364/723, 724.1; 381/61–65

[56] References Cited

U.S. PATENT DOCUMENTS

| | | | |
|---|---|---|---|
| 4,602,545 | 7/1986 | Starkey | 84/607 |
| 4,649,787 | 3/1987 | Deutsch | 84/607 X |
| 4,840,100 | 6/1989 | Adachi et al. | 84/604 |
| 5,050,474 | 9/1991 | Ogawa et al. | 84/603 |
| 5,117,725 | 6/1992 | Takauji et al. | 84/607 X |
| 5,218,155 | 6/1993 | Saito | 84/607 X |
| 5,252,773 | 10/1993 | Kozuki et al. | 84/607 |
| 5,266,734 | 11/1993 | Komano et al. | 84/607 |
| 5,432,293 | 7/1995 | Nonaka et al. | 84/607 |
| 5,496,964 | 3/1996 | Suzuki | 84/660 |
| 5,524,074 | 6/1996 | Massie | 381/62 |
| 5,559,298 | 9/1996 | Okamoto | 84/607 |
| 5,670,728 | 9/1997 | Ogai et al. | 84/607 |
| 5,684,260 | 11/1997 | Van Buskirk | 84/604 |

*Primary Examiner*—Stanley J. Witkowski
*Attorney, Agent, or Firm*—Graham & James LLP

[57] ABSTRACT

A musical tone-generating method and apparatus therefor are provided. Musical tones are generated by reading waveform data from a waveform table at a predetermined sampling frequency and carrying out arithmetic operations on the waveform data read from the waveform table to generate musical tone waveform samples, by the use of a processing unit. A first sampling frequency or a second sampling frequency lower than the first sampling frequency is selected as the predetermined sampling frequency. Interpolation of the waveform data read from the waveform table is effected by a second interpolation method which is lower in accuracy than a first interpolation method employed when the first sampling frequency is used, or alternatively the interpolation is inhibited, when the second sampling frequency is selected as the predetermined sampling frequency.

7 Claims, 9 Drawing Sheets

MUSICAL TONE-GENERATING METHOD AND APPARATUS USING DATA INTERPOLATION

BACKGROUND OF THE INVENTION

1. Field of the Invention

This invention relates to a musical tone-generating method for generating waveform samples of musical tones through arithmetic operations by the use of a programmable processing unit, such as a CPU (central processing unit) and a DSP (digital signal processor).

2. Prior Art

Conventionally, musical tones have been electronically generated by a tone generator incorporating a processing unit, such as a CPU (central processing unit) or a DSP (digital signal processor), which executes waveform-generating operations to generate waveform samples of musical tones, or by a general-purpose computer, such as a PC (personal computer), which executes a musical tone-generating program to generate musical tones without using special-purpose hardware.

To electronically generate musical tones, it is required to supply waveform samples generated by arithmetic operations to a DAC (digital-to-analog converter) whenever a sampling period elapses, i.e. in synchronism with digital-to-analog conversion timing of the DAC. This requires a very large amount of operation to be executed by the processing unit (hereinafter referred to as "the CPU"). In other words, to generate musical tones, the CPU has to execute processing for preparing musical tone control information and processing for generating waveform samples in response to performance information input thereto, such as MIDI event information.

For example, in the case of a tone generator employing a waveform memory method, the processing for generating waveform samples is executed in the following manner: Based on tone control information prepared from performance information, waveform-determining operations are executed for each tone generation channel by an LFO (Low Frequency Oscillator), a filter EG (envelope generator), a volume EG, etc. Waveform data is read from a waveform memory (waveform table) corresponding to the input performance information, while executing interpolation on the waveform data read from the waveform memory, if required. The resulting waveform data is multiplied by various kinds of EG waveform samples to thereby generate waveform sample data for a specific tone generation channel. These operations are repeatedly carried out for all the tone generation channels, and waveform sample data is accumulated for all the channels to thereby generate waveform data comprised of waveform samples each corresponding to a single sampling time period, i.e. the above-mentioned digital-to-analog conversion timing.

As stated above, the amount of operation executed by the CPU for generating waveform samples of musical tones by arithmetic operations is very large. Further, the amount of operation dynamically varies depending upon the number of channels being used for sounding and the contents of tone-generating operations being executed.

Such a large processing load on the CPU causes the following inconveniences: It is impossible to increase the number of channels which can be used for tone generation. When a software tone generator program (hereinafter referred to as "software tone generator") is executed by a general-purpose computer in parallel with other application programs, the operations of these application programs can be made unstable due to a variation (particularly, an increase) in the amount of operation to be executed by the software tone generator.

Further, the amount of operation which can be allotted to the operation of the software tone generator is limited by the number and kinds of application programs being executed in parallel with the software generator, as well as the processing capacity of the processing unit which executes the application programs. Even when the amount of operation allotted to the software tone generator is strictly limited, the waveform-generating operation of a conventional software tone generator program is executed in a fixed manner, and this makes it impossible for a user to select between a preference of increasing the number of tones to be generated at the cost of the quality of waveform-generating operation of the CPU and a preference of executing high-quality waveform-generating operation at the cost of the number of tones to be generated.

To reduce the processing load on the CPU, one possible measure is to decrease the sampling frequency employed to sample waveform data to generate musical tones. Decrease of the sampling frequency makes it possible to reduce the number of times of waveform-generating operations to be executed, thereby reducing the processing load on the CPU.

In general, when the sampling frequency employed in generating musical tones is decreased, the upper limit frequency of the frequency band of musical tones generated also decreases. More specifically, as shown in FIG. 9A, when the sampling frequency is set to a frequency represented by a symbol fs, it is possible to generate musical tones within a frequency range having an upper limit value of fs/2 (indicated by the solid line). However, when the sampling frequency is decreased to a value of fx ($fx<fs$), musical tones generated are within a frequency range having an upper limit value of fx/2 (indicated by the broken line).

Therefore, if a low sampling frequency is employed in generating musical tones having high frequency components, such as ones generated from a cymbal or snares of a snare drum, the energy of high-frequency components decreases, so that musical tones having poor energy balance are generated.

SUMMARY OF THE INVENTION

It is a first object of the invention to provide a musical tone-generating method and a musical tone-generating apparatus which are capable of preventing the energy of high-frequency components of musical tones from being decreased even when the sampling rate of waveform samples is lowered to decrease load on a CPU (central processing unit) in executing waveform-generating operations to generate musical tones.

It is a second object of the invention to provide a musical tone-generating method and a musical tone-generating apparatus which are capable of generating musical tones accentuated in a high-frequency range.

To attain the above objects, according to a first aspect of the invention, there is provided a musical tone-generating method of generating musical tones by reading waveform data from a waveform table at a predetermined sampling frequency and carrying out arithmetic operations on the waveform data read from the waveform table to generate musical tone waveform samples, by the use of a processing unit.

The musical tone-generating method according to the first aspect of the invention is characterized by comprising the steps of:

selecting a first sampling frequency or a second sampling frequency lower than the first sampling frequency as the predetermined sampling frequency; and interpolating the waveform data read from the waveform table by a second interpolation method which is lower in accuracy than a first interpolation method employed when the first sampling frequency is used, when the second sampling frequency is selected as the predetermined sampling frequency.

Preferably, when the second sampling frequency is selected as the predetermined sampling frequency, the waveform data read from the waveform table is interpolated by the second interpolation method when a musical tone having a particular tone color is to be generated from the waveform data.

More preferably, the musical tone having the particular tone color is a musical tone having noisy high-frequency components.

To attain the above objects, according to a second aspect of the invention, there is provided a musical tone-generating method of generating musical tones by reading waveform data from a waveform table at a predetermined sampling frequency and carrying out arithmetic operations on the waveform data read from the waveform table to generate musical tone waveform samples, by the use of a processing unit.

The musical tone-generating method according to the second aspect of the invention is characterized by comprising the steps of:

selecting a first sampling frequency or a second sampling frequency lower than the first sampling frequency as the predetermined sampling frequency; and inhibiting interpolation of the waveform data read from the waveform table when the second sampling frequency sampling is selected as the predetermined sampling frequency.

Preferably, when the second sampling frequency is selected as the predetermined sampling frequency, the interpolation of the waveform data read from the waveform table is inhibited when a musical tone having a particular tone color is to be generated from the waveform data.

More preferably,the musical tone having the particular tone color is a musical tone having noisy high-frequency components.

To attain the above objects, according to a third aspect of the invention, there is provided a musical tone-generating method of generating musical tones by reading waveform data from a waveform table and carrying out arithmetic operations on the waveform data read from the waveform table to generate musical tone waveform samples, by the use of a processing unit.

The method according to the third aspect of the invention is characterized in that when a musical tone having a particular tone color is to be generated from the waveform data read from the waveform table, the waveform data read from the waveform table is interpolated by a second interpolation method which is lower in accuracy than a first interpolation method employed when a musical tone having a tone color other than the particular tone color is to be generated.

Preferably, the second interpolation method is a two-point interpolation method using a linear function.

To attain the above objects, according to a fourth aspect of the invention, there is provided a musical tone-generating apparatus having a processing unit for reading waveform data from a waveform table at a predetermined sampling frequency, and carrying out arithmetic operations on the waveform data read from the waveform table to generate musical tone waveform samples.

The musical tone-generating apparatus according to the fourth aspect of the invention is characterized in that the processing unit includes first interpolating means for interpolating the waveform data read from the waveform table by a first interpolation method, and second interpolating means for interpolating the waveform data read from the waveform table by a second interpolation method which is lower in accuracy than the first interpolation method, and the musical tone-generating apparatus comprises sampling frequency-selecting means for selecting a first sampling frequency or a second sampling frequency lower than the first sampling as the predetermined sampling frequency, and control means for causing the second interpolating means to interpolate the waveform data read from the waveform table when the second sampling frequency is selected by the sampling frequency-selecting means.

To attain the above objects, according to a fifth aspect of the invention, there is provided a musical tone-generating apparatus having a processing unit for reading waveform data from a waveform table at a predetermined sampling frequency, and carrying out arithmetic operations on the waveform data read from the waveform table to generate musical tone waveform samples.

The musical tone-generating apparatus according to the fifth aspect of the invention is characterized in that the processing unit includes interpolating means for interpolating the waveform data read from the waveform table, and the musical tone-generating apparatus comprises sampling frequency-selecting means for selecting a first sampling frequency or a second sampling frequency lower than the first sampling as the predetermined sampling frequency, and interpolation-inhibiting means for inhibiting the interpolating means from interpolating the waveform data read from the waveform table when the second sampling frequency is selected by the sampling frequency-selecting means.

To attain the above objects, according to a sixth aspect of the invention, there is provided a machine readable storage medium-storing instructions to cause a machine to perform a musical tone-generating method of generating musical tones by reading waveform data from a waveform table at a predetermined sampling frequency and carrying out arithmetic operations on the waveform data read from the waveform table to generate musical tone waveform samples, by the use of a processing unit, the method comprising the steps of:

selecting a first sampling frequency or a second sampling frequency lower than the first sampling frequency as the predetermined sampling frequency; and interpolating the waveform data read from the waveform table by a second interpolation method which is lower in accuracy than a first interpolation method employed when the first sampling frequency is used, when the second sampling frequency is selected as the predetermined sampling frequency.

The above and other objects, features, and advantages of the invention will become more apparent from the following detailed description taken in conjunction with the accompanying drawings.

BRIEF DESCRIPTION OF THE DRAWINGS

Figs. 3A to 3E are diagrams showing storage areas used in the embodiment, in which:

FIG. 3A shows an input buffer;

FIG. 3B shows a sample buffer;

FIG. 3C shows an output buffer;

FIG. 3D shows a tone color data register; and

FIG. 3E shows a tone generator register;

DETAILED DESCRIPTION

Next, the invention will now be described in detail with reference to the drawings showing a preferred embodiment thereof.

Figure 1:
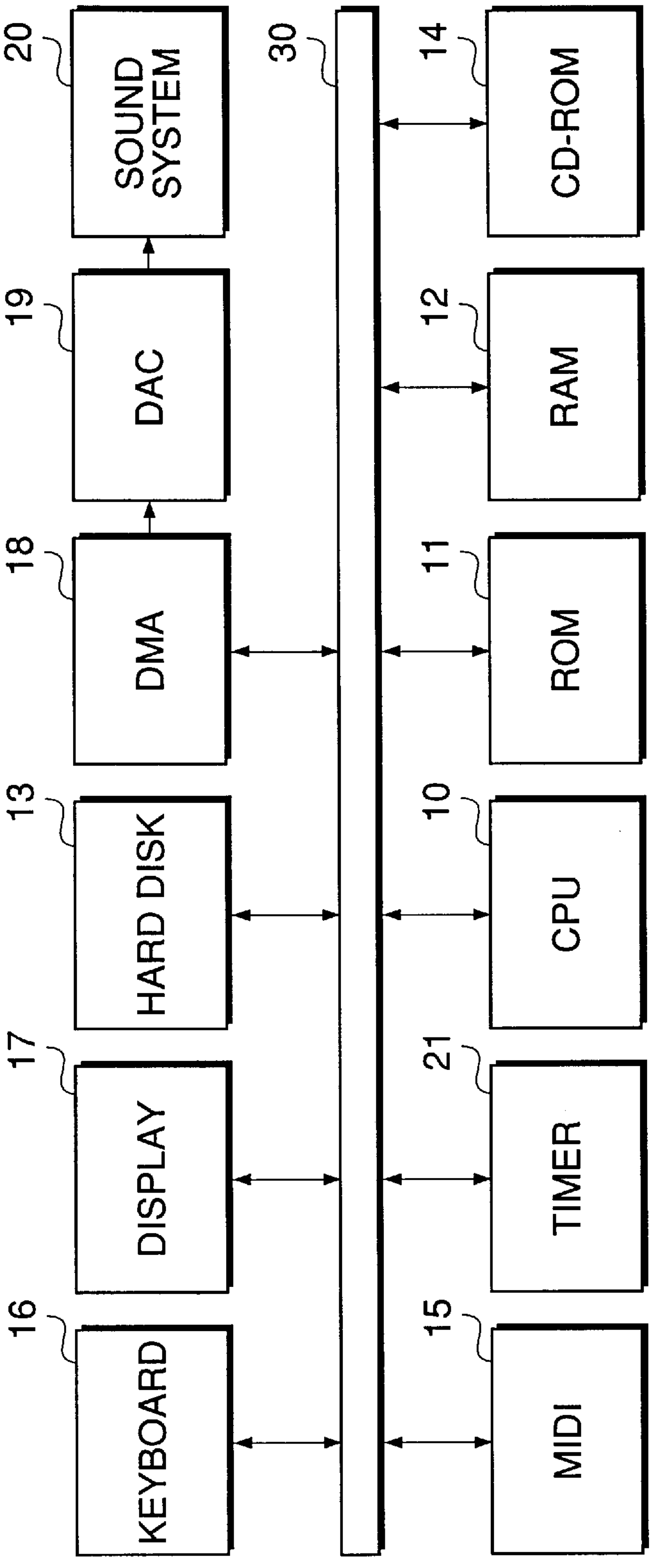
FIG. 1 is a block diagram schematically showing the whole arrangement of a musical tone-generating apparatus according to an embodiment of the invention.

Referring first to FIG. 1, there is shown a musical tone-generating apparatus according to an embodiment of the invention. In the figure, reference numeral 10 designates a central processing unit (CPU) which generates waveform samples of musical tones and executes various kinds of application programs, etc., 11 a read only memory (ROM) storing preset tone color data, etc., 12 a random access memory (RAM) for storing programs to be executed and data, as well as for providing work areas and various buffer areas, 13 a hard disk unit for storing various kinds of application programs, etc., and 14 a CD-ROM unit for driving CD-ROM's storing various kinds of data and programs, 15 a MIDI interface for transmitting and receiving performance data and control signals to and from a performance apparatus, such as a MIDI keyboard, which is externally connected to the present musical tone-generating apparatus. Reference numerals 16 and 17 designate a keyboard and a display unit, respectively, which are used as component parts of a general-purpose personal computer.

Reference numeral 18 designates a DMA (direct memory access) controller which reads waveform sample data directly from an output buffer area of the RAM 12, i.e. not through the CPU 10, 19 a DAC (digital-to-analog converter) for converting the waveform data from the DMA 18 to an analog tone signal, and 20 a sound system for amplifying the analog tone signal from the DAC 19 and sounding the resulting signal. Reference numeral 21 designates a timer for generating an interrupt signal for interrupting the CPU 10 at predetermined time intervals and at the same time supplying sampling clocks to the DMA controller 18. These component parts 10 to 18 are connected to each other via a bus 30. The above described arrangement of the present musical tone-generating apparatus is identical with that of a general-purpose personal computer or work station. That is, the method according to the present invention can be implemented by a general-purpose personal computer or work station.

Figure 2:
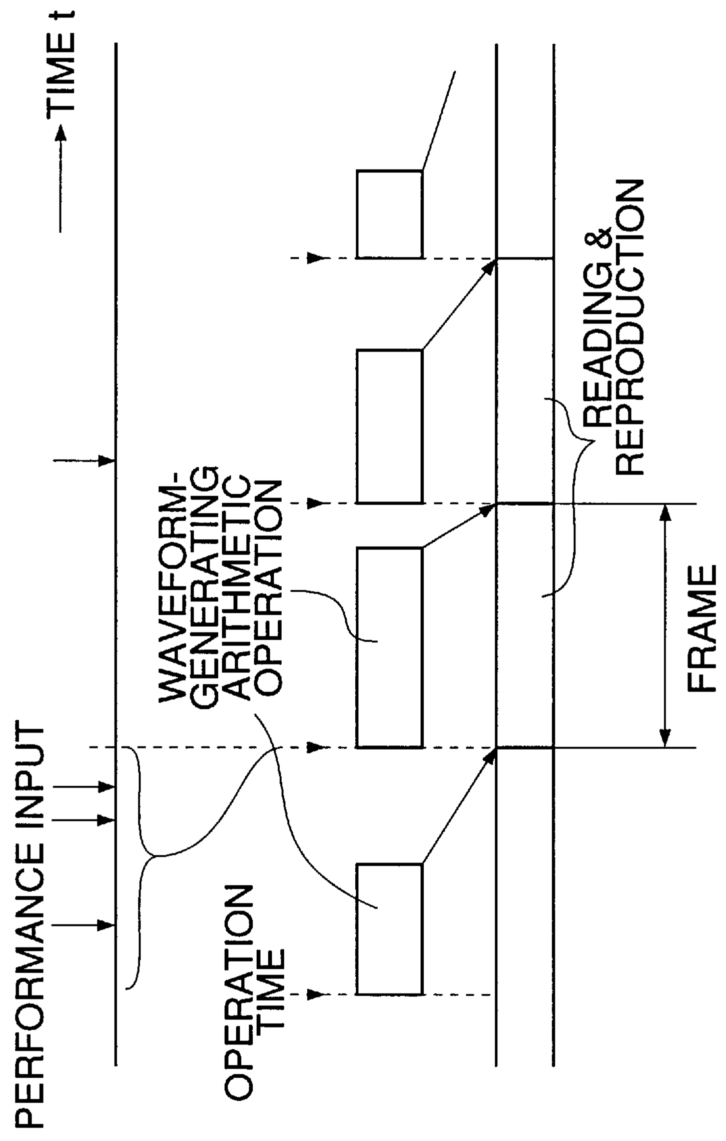
FIG. 2 is a diagram which is useful in explaining a flow of operations executed as time elapses by the embodiment.

FIG. 2 shows a flow of operations of a software tone generator implementing the present musical tone-generating method, which are executed by the musical tone-generating apparatus described above. The software tone generator normally generates waveform data of musical tones e.g. at a sampling frequency (rate) of 48 kHz (basic sampling frequency). The waveform data-generating operation is executed every predetermined time period e.g. corresponding to 128 samples (1 frame). When performance data is input at a time slot corresponding to a frame, waveform data of a musical tone corresponding to the performance data input is calculated and generated by arithmetic operations in the immediately following frame, and then the waveform data of the musical tone thus generated is read out sample by sample every period of 48 kHz to form a musical tone signal in the next frame. That is, there is a time lag of about two frames between inputting of performance data and actual generation of musical tones (or attenuation of musical tones). However, since one frame is formed of 128 samples (which corresponds to about 2.67 milliseconds), the time lag is very small. The number of samples for one frame can be set as desired. However, as the number of samples is increased, there occurs an increasing delay of sounding, whereas as the number of samples is decreased, the margin of processing time decreases to degrade the responsiveness to an occasional increase in the amount of processing.

The present embodiment will be described on the assumption that a so-called table look-up method is employed which generates musical tones based on waveform samples stored in waveform tables provided in the RAM 12. Further, it is assumed that the software tone generator has 32 tone generation channels at the maximum.

Figure 3A:
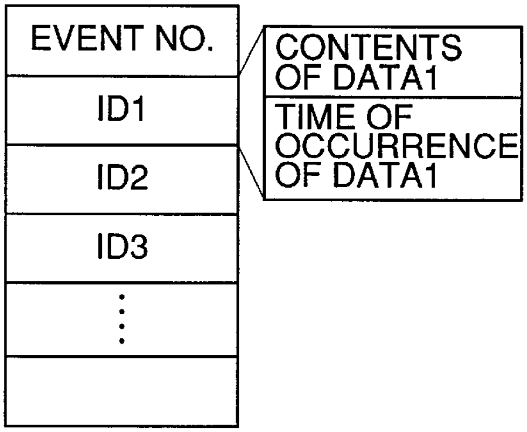

FIGS. 3A to 3E show storage areas of the RAM 12 allocated during operation of the software tone generator. FIG. 3A shows an input buffer for storing performance data input via the MIDI interface, together with data indicative of a time point of occurrence of the input event. The data or contents stored in this buffer are read out during MIDI processing, referred to hereinafter, to execute operations corresponding thereto.

Figure 3B:
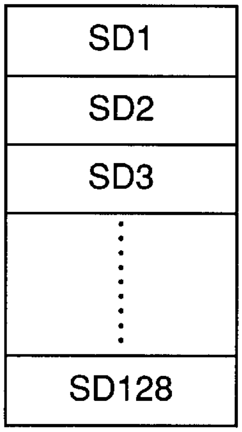
Figure 3C:
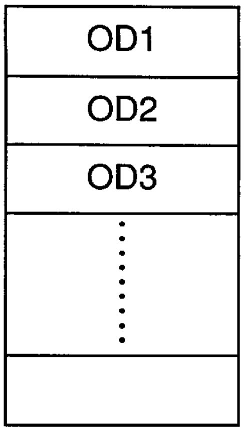

FIG. 3B shows a sample buffer WB, and FIG. 3C an output buffer OB. These buffers have an identical construction, that is, they are each provided with waveform data storage areas (SD1 to SD128, or OD1 to OD128) for storing 128 samples. The output buffer OB stores waveform data synthesized by sequentially adding up waveform data of musical tones for the 32 channels. The waveform data are generated by executing arithmetic operations on 128 samples of waveform data over a time period corresponding to one frame for each channel, and the same process is repeatedly carried out for all 32 channels at the maximum (i.e. for active channels). The sample buffer WB stores waveform data for one channel, and whenever waveform data for one i-th channel is obtained, the output buffer OB accumulates the thus obtained waveform data, i.e. in synchronism with the sampling timing.

Figure 3D:
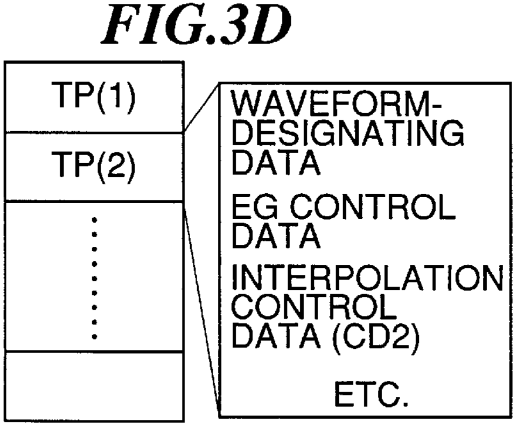

FIG. 3D shows a tone color register. The tone color register stores tone color data which determines a waveform of a musical tone generated by each MIDI channel (performance part). The tone color data includes waveform-designating data for designating a waveform table as material data for each range of an individual tone color, EG control data, interpolation control data (CD2), etc.

Figure 3E:
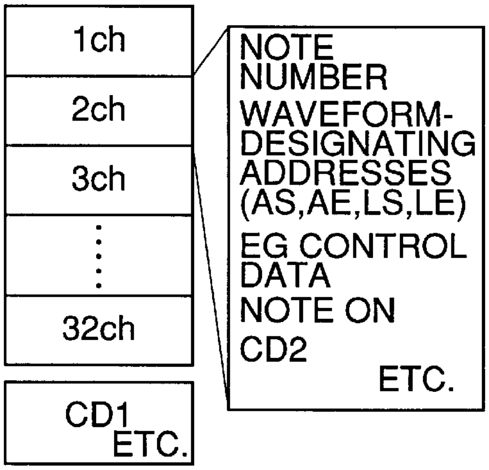

FIG. 3E shows a tone generator register. The tone generator register stores, separately for each tone generation channel, data for determining the waveform of a musical tone to be generated via the tone generation channel. The data stored in the tone generator register includes a note number, waveform-designating addresses (attack-start address AS, attack-end address AE, loop-start address LS, loop-end address LE) of a specific waveform table, filter control data, EG control data, note-on data, interpolation control data (CD2), etc.

Figure 9A:
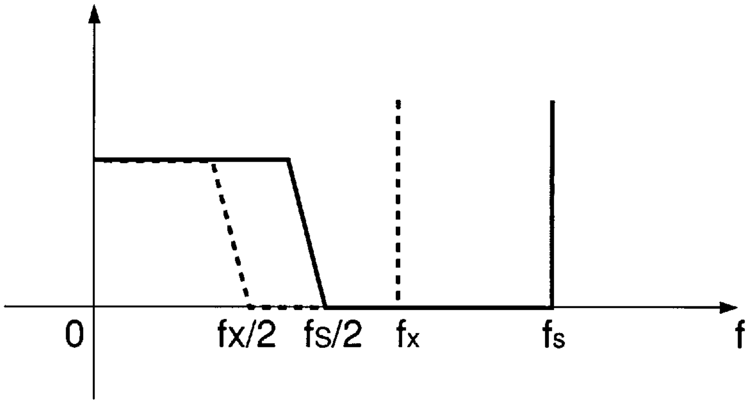
FIGS. 9A through 9C are diagrams which are useful in explaining effects of changes in the sampling rate of waveform samples.

As stated hereinabove, the tone generator source using the method of the present invention normally generates musical tones at the basic sampling frequency fs of 48 kHz. However, to decrease load on the CPU, the operator can change the setting for the sampling frequency as desired so as to cause musical tones to be generated at a sampling frequency lower than 48 kHz. When the operator sets the sampling frequency to a lower frequency fx (fx<fs), the frequency band of musical tones generated falls in a range lower than a value fx/2, as discussed hereinabove in describing the prior art with reference to FIG. 9A. As a result, musical tones of a cymbal or snares of a snare drum are attenuated in a high-frequency range and hence have poor energy balance. In the present embodiment, interpolation is inhibited from being carried out for such musical tones, thereby preventing the energy balance of generated musical tones from being degraded.

Figure 9B:
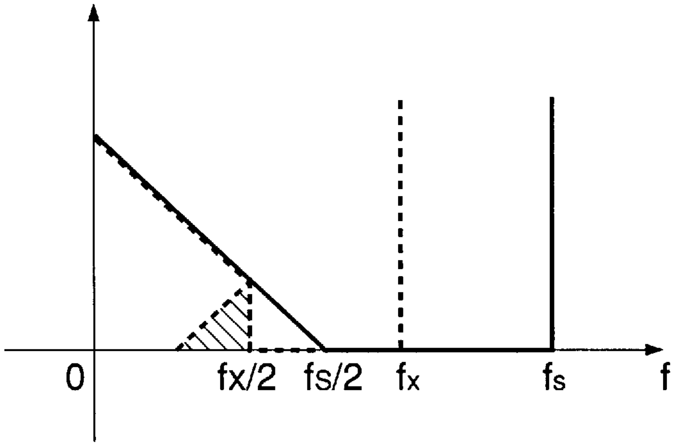
Figure 9C:
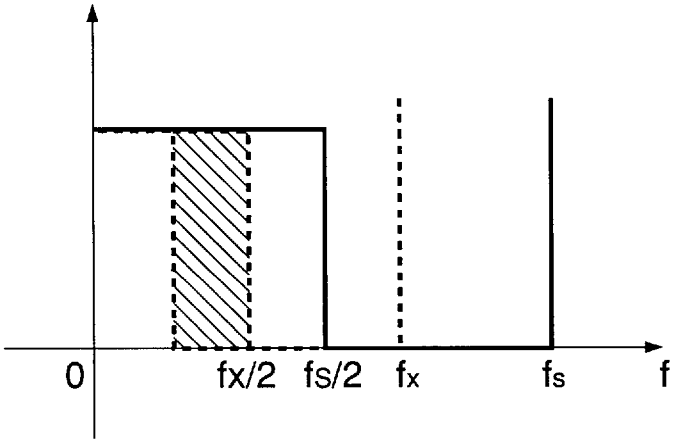

More specifically, when the sampling frequency is decreased from a value fs to fx, if calculation of data corresponding to a midpoint between two adjacent reading addresses of a waveform table by interpolation is inhibited, there occurs noise caused by an error resulting from the inhibition of interpolation. Such an error increases in a higher frequency range where the amount of variation in amplitude per unit time is larger, so that more noise components are generated in a higher frequency range than in a lower frequency range. These noise components result in so-called aliasing noise, as indicated by hatched portions in FIG. 9B and 9C. When a musical tone to be generated has large energy in a low-frequency range but small energy in a high-frequency range, as is the case with musical tones of percussion instruments, particularly ones having dominant low-frequency components, aliasing noise as shown in FIG. 9B is generated. In such a case, the amount of energy in the high-frequency range is not large, and therefore the aliasing noise has a small adverse effect on musical tones generated. On the other hand, in the case of musical tones having large energy in a high-frequency range, as shown in FIG. 9C, such as tones generated by a cymbal or snares of a snare drum which has noise-like high-frequency components, the aliasing noise components become large, so that energy in a high-frequency range is emphasized, thereby compensating for loss of energy balance caused by a lowered sampling frequency.

Further, the inhibition of interpolation results in a decreased amount of operation, thereby further decreasing the processing load on the CPU.

Next, the operation of the software tone generator using the present method will be described with reference to FIGS. 4A to 8.

Figure 4A:
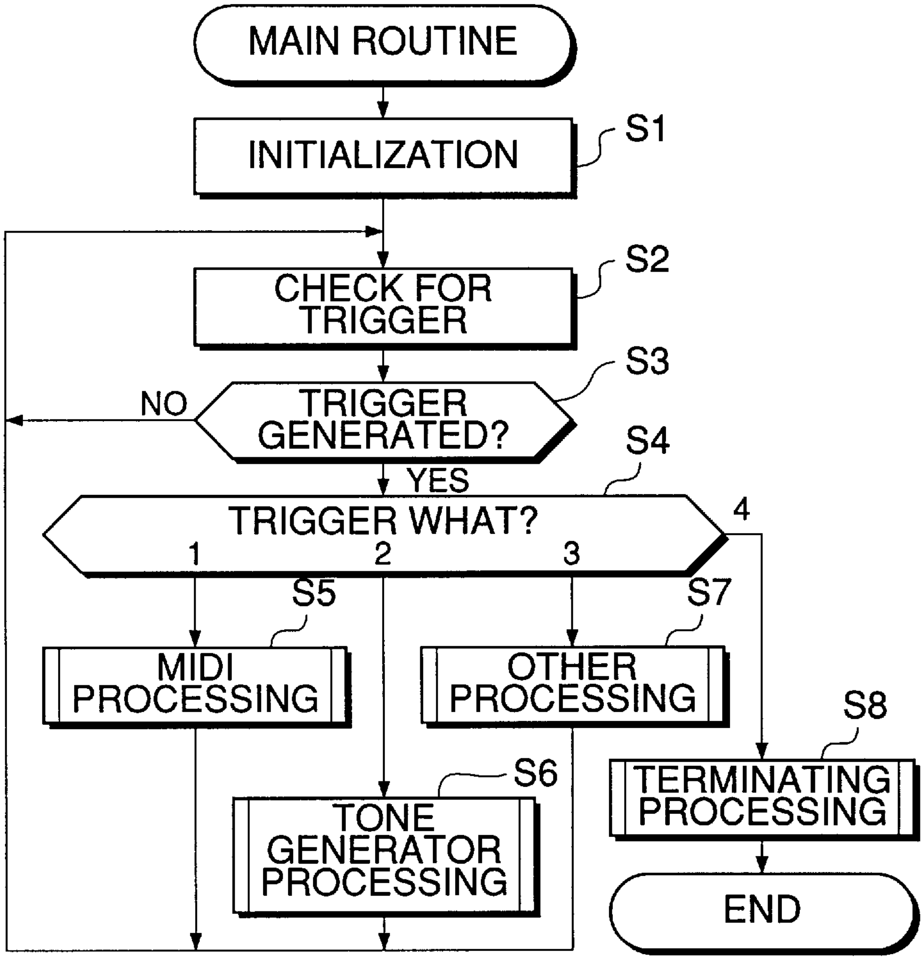
FIG. 4A is a flowchart showing a main routine executed by the embodiment.

FIG. 4A shows a main routine executed by the software tone generator. Upon starting of the tone generator program, initialization is executed, such as allocation of register areas, at a step Sl, and then the CPU 10 is placed in a standby state at steps S2 and S3 until a trigger of any kind occurs. When a trigger has occurred, it is determined at a step S4 what kind of trigger has occurred. The trigger can be (1) writing of MIDI data into the input buffer, (2) generation of an interrupt signal by the timer 21 whenever a time period corresponding to one frame elapses, (3) occurrence of a switch event via a control panel, a window screen or the like, and (4) inputting of a termination command. According to the kind of trigger generated, one of MIDI processing (step S5), tone generator processing (step S6), other processing (step S7) and terminating processing (step S8) is executed.

By the terminating processing (step S8), settings of data are saved and the registers are cleared. Upon completion of this processing, the program is terminated. The other processing (step S7) is executed in response to various kinds of inputting via the control panel or command inputting, and includes sampling rate setting-changing event processing executed when a sampling rate setting-changing command is entered via the control panel or the window screen. The sampling rate setting-changing event processing will be described in detail hereinafter with reference to FIG. 8. The tone generator processing (step S6) is executed in response to an interrupt generated by the timer 21 when it counts up and delivers 128 sample clocks or a trigger or the like generated by the DMA controller 18 for notifying that the reading of waveform data, described with reference to FIG. 2, proceeds to a next frame.

Figure 4B:
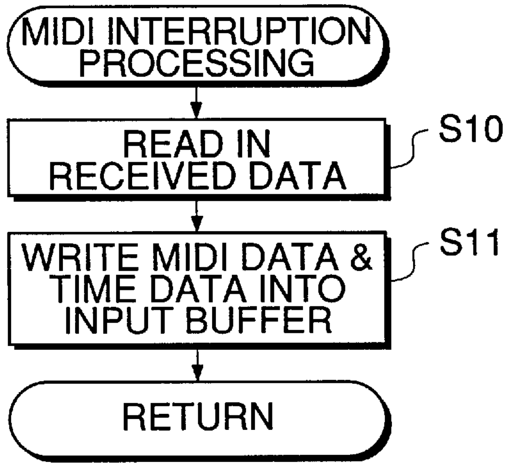
FIG. 4B is a flowchart showing a MIDI interrupt processing routine.

FIG. 4B shows an MIDI interrupt handling routine executed as a top-priority interrupt handling routine. The interrupt handling routine is started when MIDI data is received from the MIDI interface 15. The MIDI data is fetched at a step S10, and the received MIDI data and data indicative of the receiving time point are written into the input buffer appearing in FIG. 3A at a step S11.

The MIDI processing (step S5) is started when the MIDI data is written into the input buffer, and operations corresponding to the written MIDI data are executed.

Figure 5:
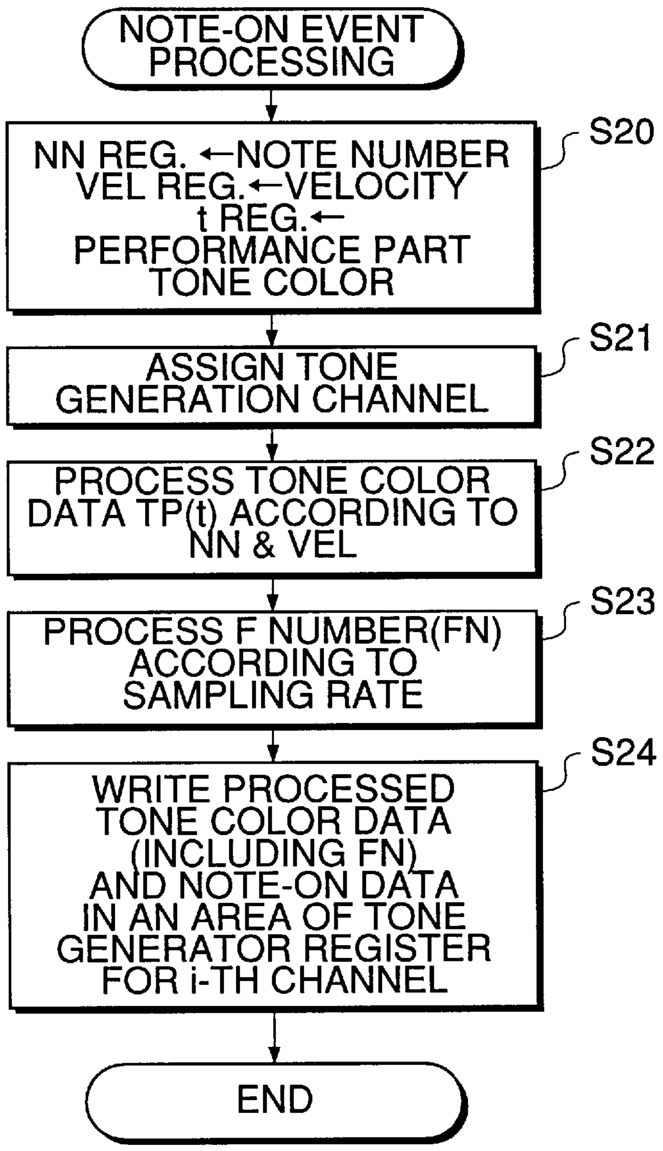
FIG. 5 is a flowchart showing a note-on event processing routine.

FIG. 5 shows a note-on event processing routine as one of routines for executing the MIDI processing. The note-on event processing routine is executed when note-on event data is written into the input buffer. First, a note number, velocity data, and a part-specific tone color of the note-on event data are stored in an NN register, a VEL register and a t register, none of which is shown, respectively, at a step S20. Then, a tone generation channel for a musical tone to be generated by the note-on event is assigned to one of the 32 tone generation channels and data indicative of the assigned tone generation channel (i-th channel) is stored in an i-th register at a step S21. The tone color data TP(t) to be generated by the note-on event is processed according to the note number NN and the velocity data VEL at a step S22. Then, an F number (FN) of the note-on event data is processed according to the sampling rate at a step S23, and the processed tone color data (including FN) as well as data indicative of the note-on event are written into an area of the tone generator register for the i-th channel designated by the data stored in the i register at a step S24.

The F number (FN) is data for designating an amount of advance in reading addresses for reading waveform data from a waveform table at the sampling period to generate a musical tone having a pitch designated by the note number. When the sampling frequency is changed from the basic one fs (48 kHz in the present embodiment) to another frequency fx, it is required to change the F number to generate a musical tone having the pitch designated by the note number. For example, when the sampling frequency of 48 kHz is reduced by half to 24 kHz, it is necessary to increase the F number, i.e. the amount of advance in reading addresses for reading waveform data from the waveform table, to a value two times as large as the original amount of advance. To this end, if the sampling frequency fx is employed, the F number is changed to a value $FN'=(fs/fx)\times FN$ at a step S23.

Figure 6:
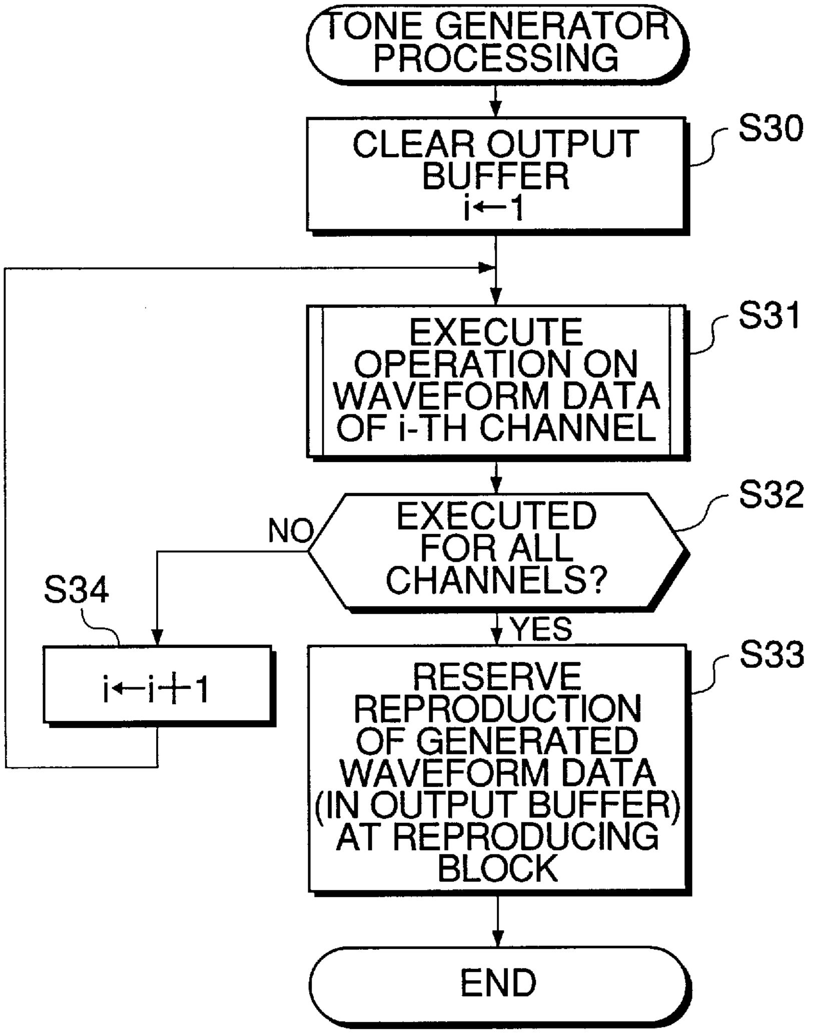
FIG. 6 is a flowchart showing a tone generator processing routine.

FIG. 6 shows a routine for carrying out the tone generator processing (waveform-generating arithmetic operation) executed at the step S6 in FIG. 4A at a repetition period corresponding to one frame. First, the output buffer OB is cleared, and at the same time a pointer i for indicating the order of arithmetic operations to be carried out is set to "1" at a step S30. Then, an arithmetic operation on waveform data of the i-th channel is executed at a step S31. Details of the arithmetic operation on the waveform data of the i-th channel will be described hereinafter with reference to FIG. 7. When this arithmetic operation (step S31) has been completed, it is determined at a step S32 whether or not arithmetic operations on waveform data of all the tone generation channels have been completed. If the arithmetic operations have not been completed, the pointer i is incremented to "i+1" at a step S34, and an arithmetic operation on waveform data of the next channel i is executed at the step s31. When the arithmetic operations on the waveform data of all the channels have been completed, reproduction of waveform data generated in the output buffer OB is reserved at the DMA controller 18 at a step S33. The reservation for reproduction is executed by notifying the DMA controller 18 of memory addresses within the RAM 12.

Figure 7:
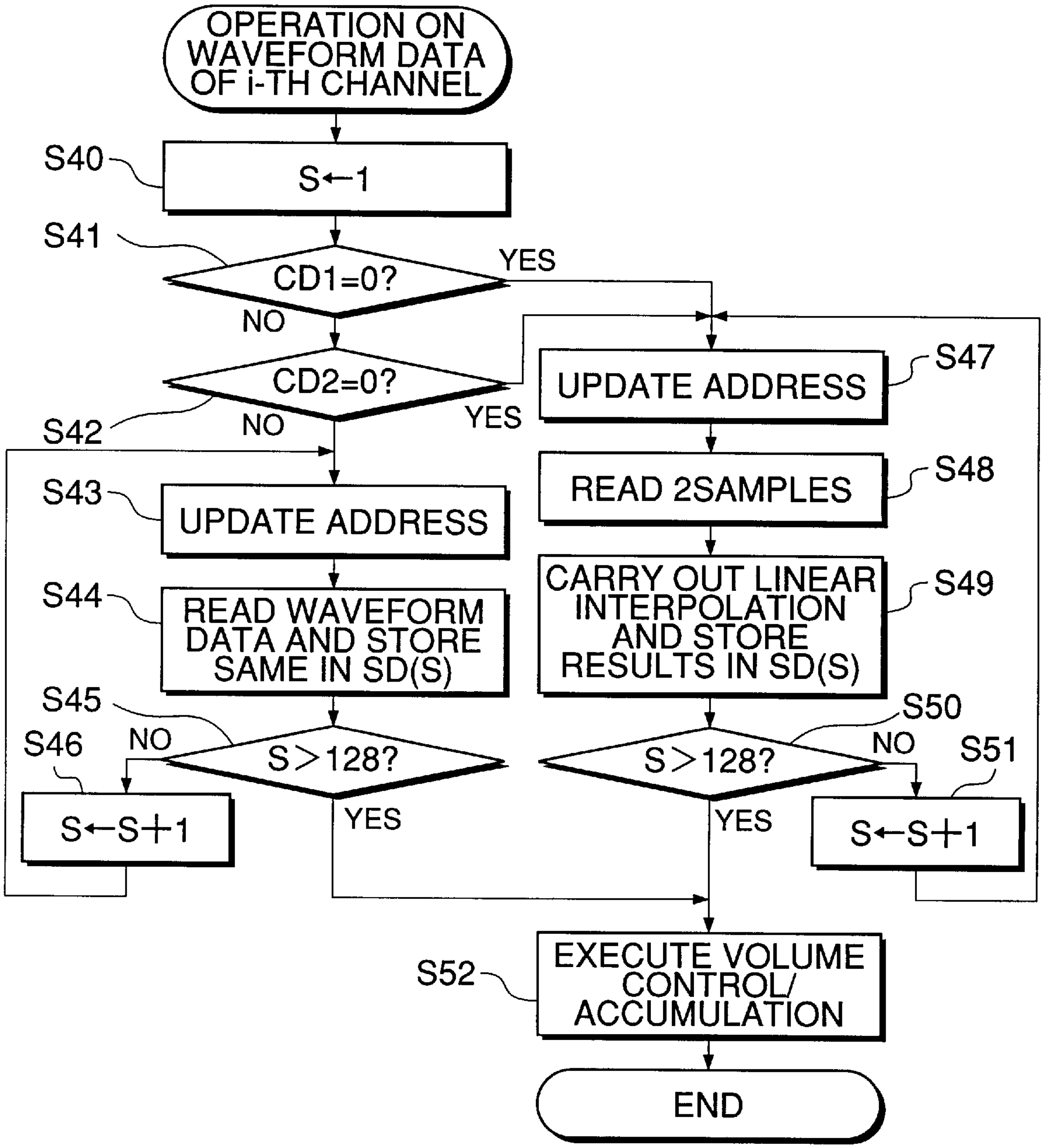
FIG. 7 is a flowchart showing a waveform data-generating routine.

FIG. 7 shows a routine for carrying out the arithmetic operation on the waveform data of the i-th channel executed at the step S31 in FIG. 6. This routine is executed to generate waveform data for a channel designated by the pointer i by collectively processing one frame (128 samples) of data. First, a sample number counter s is set to "1" at a step S40. Then, sampling rate change data CD1 is referred to at a step S41 to determine whether or not the sampling rate has been changed. If CD1=0 holds, it means that the sampling rate has not been changed, that is, the default sampling rate of 48 kHz is currently used, whereas if CD1=1 holds, it means that the sampling rate has been reduced to a value lower than 48 kHz.

If CD1=1 holds at the step S41, i.e. the sampling rate has been reduced, interpolation control data CD 2 is referred to at a step S42 to determine whether or not the present tone generation i-th channel is one for which interpolation of waveform data need not be executed, or one for which the interpolation should be executed. If CD2=1 holds, it means that the present tone generation i-th channel is one for which the interpolation should be omitted, whereas if CD2=0, it means that the same is one necessitating the interpolation. Usually, it is preferred that the interpolation is omitted for tone generation channels for generating noisy tones, such as tones of drums requiring no pitch conversion, while the same is executed for tone generation channels for generating tones of scale notes.

If it is determined at the step S42 that the interpolation should be omitted (CD2=1), the F number (the processed F number obtained at the step S23 in FIG. 5) is added to the immediately preceding reading address used in the arithmetic operation on waveform data (the last address generated for reading waveform data of the immediately preceding frame for the present tone generation channel) to update the reading address at a step S43. A waveform sample is read from a waveform table designated by an integer part of the reading address thus updated, and set to a sample buffer SD(s) at a step s44. This operation is repeatedly carried out from s="1" to s="128", at steps S45 and S46, and upon completion of 128 times repetition of the operation, volume control/data-accumulating processing is executed at a step S52, followed by the program returning to the tone generator processing (FIG. 6).

In this case, the interpolation is omitted and a decimal part of the address is ignored, so that aliasing noise is produced. As described hereinbefore, these noise components emphasize a high-frequency range of musical tones generated, so that the musical tones generated have excellent energy balance.

On the other hand, if it is determined at the step S41 that the sampling rate change data CD1=0 holds, i.e. if the sampling rate has not been changed and therefore the present program is operated at the sampling frequency of 48 kHz, or if it is determined at the step S42 that the interpolation control data CD 2=0 holds, i.e. if the tone generation channel demands execution of the interpolation even when the sampling rate has been changed, the F number is added to the immediately preceding reading address to update the same at a step S47.

Normally, a reading address having an integer part and a decimal part is generated, so that waveform data of two samples (a sample designated by the integer part and a sample designated by the integer part+1) are read from the designated waveform table at a step S48. The data of two samples are subjected to linear interpolation by the use of the value of the decimal part, and the resulting value is set into the sample buffer SD(s) at a step S49. This operation is repeatedly carried out from s="1" to s="128", at steps S50 and S51, and upon completion of 128 times repetition of the operation, the volume control/data-accumulating processing is executed at the step S52, followed by the program returning to the tone generator processing (FIG. 6) In this case, aliasing noise is not produced since the linear interpolation is carried out by the use of the decimal part of the reading address.

In the volume control/data-accumulating processing (step S52), volume control is carried out to impart time-dependent variation in volume from an attack of a musical tone to a release of the same to values stored in the sample buffer WB (SD(1) to SD(128)) based on an envelope set according to the amplitude EG and a channel volume control parameter. The envelope set according to the amplitude EG is generally in the form of a gentle curve and hence a single EG value is sufficient for 128 samples. The values thus controlled in volume level and set into the sample buffer WB are added to values of corresponding samples (waveform date) in the output buffer OB (OD(1) to OD(128)). The addition is sequentially carried out for each channel set to an "i-th" place in the order of operation, whereby waveform data of all the tone generation channels thus far generated are stored in the output buffer OB.

Figure 8:
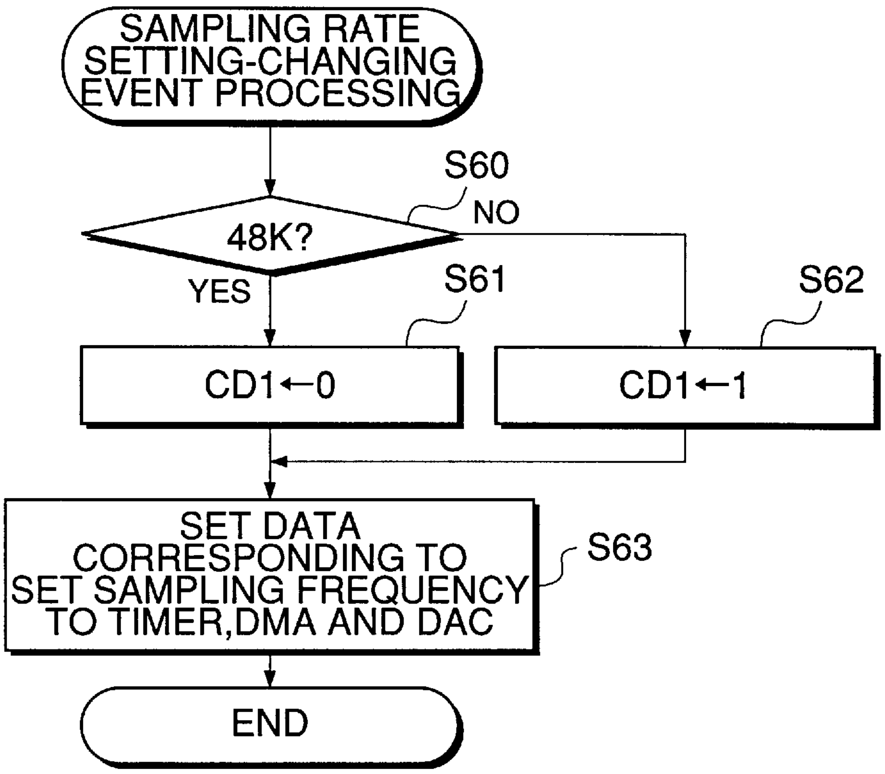
FIG. 8 is a flowchart showing a sampling rate change event processing routine.

Next, the sampling rate setting-changing event processing executed at the step S7 of the FIG. 4 main routine will be described in detail with reference to FIG. 8. When the sampling rate setting-changing command is entered, it is determined at a step S60 whether or not the sampling rate set by the operator is equal to 48 kHz. If the sampling rate is set to 48 kHz, the sampling rate change data CD1 is set to 0 at a step S61, whereas if the same is set to a value lower than 48 kHz, the sampling rate change data CD1 is set to 1 at a step S62. Then, data or a value corresponding to the sampling rate (frequency) thus set is set to the timer 21, the DMA controller 18 or the DAC 19 at a step S63, followed by terminating the sampling rate setting-changing event processing.

By this processing, the repetition period of interrupt to the CPU 10 by the timer 21 is set to a time period conforming to the sampling frequency set as above. Further, the DMA controller 18 is supplied with sampling clocks corresponding to the set sampling frequency. As a result, the CPU 10 executes the waveform-generating arithmetic operation at time intervals corresponding to the sampling frequency thus set, while the DAC 19 is supplied with waveform samples of musical tones at a repetition period corresponding to the sampling frequency thus set, to generate musical tones.

That is, if the basic sampling frequency is fs=48 kHz, the repetition period at which the waveform-generating arithmetic operation, i.e. the FIG. 6 routine is executed is 128×(1/48 kHz)≈2.67 (milliseconds). However, if the sampling frequency is set to fx (<fs), then a repetition period of 128×(1/fx)>2.67 (milliseconds) results, so that the load on the CPU is decreased. For example, when the sampling frequency is set to 24 kHz, the repetition period at which the waveform-generating arithmetic operation is executed is two times as large as that set when the sampling frequency is 48 kHz, i.e. approximately 5.33 milliseconds, thereby reducing the processing load on the CPU 10.

Although in the above described embodiment, 128 waveform samples are generated by a single waveform-generating arithmetic operation, this is not limitative, but the number of waveform samples generated per sample-generating arithmetic operation may be decreased while setting the repetition period of execution of the waveform-generating arithmetic operation to the same time period as one set for the sampling frequency of 48 kHz. In this case as well, the time period required to perform the waveform-generating operation can be reduced and hence the processing load on the CPU 10 is decreased, similarly to the above.

Still further, although in the above described embodiment, the linear interpolation is carried out when the sampling rate is not decreased, while the interpolation is inhibited when the sampling rate is decreased, this is not limitative, but similar effects can be obtained by lowering the accuracy of interpolation when the sampling rate is decreased. More specifically, a high-accuracy interpolation, such as four-point interpolation using a cubic function, may be normally carried out when the sampling rate is high, while when the sampling rate is decreased, an interpolation lower in accuracy, such as two-point interpolation using a linear function, may be carried out, to obtain effects similar to those obtained by the present embodiment.

Further, it is generally recognized that the omission of interpolation emphasizes energy in a high-frequency range of musical tones generated irrespective of the sampling rate, as mentioned hereinbefore. Therefore, irrespective of whether the sampling rate is high or low, the interpolation may be omitted. This does not only decrease the processing load but also emphasize high-frequency components of musical tones with tone colors having noise-like components, such as tones of drums.

Although in the above described embodiment, the sampling rate is changed through a setting operation by the operator, this is not limitative, but the musical tone generating apparatus may be configured such that the optimum sampling rate is automatically set according to the processing capability of the CPU or load thereon.

What is claimed is:

1. A musical tone-generating method of generating musical tones by reading waveform data from a waveform table at a predetermined sampling frequency and carrying out arithmetic operations on said waveform data read from said waveform table to generate musical tone waveform samples, by the use of a processing unit operating on a software tone generator program, the method comprising the steps of:

selecting a first sampling frequency or a second sampling frequency lower than said first sampling frequency as said predetermined sampling frequency; and interpolating said waveform data read from said waveform table by a second interpolation method which is lower in accuracy than a first interpolation method employed when said first sampling frequency is used, to generate a musical tone having high-frequency components containing aliasing noise, when said second sampling frequency is selected as said predetermined sampling frequency.

2. A musical tone-generating method of generating musical tones by reading waveform data from a waveform table at a predetermined sampling frequency and carrying out arithmetic operations on said waveform data read from said waveform table to generate musical tone waveform samples, by the use of a processing unit operating on a software tone generator program, the method comprising the steps of:

selecting a first sampling frequency or a second sampling frequency lower than said first sampling frequency as said predetermined sampling frequency; and inhibiting interpolation of said waveform data read from said waveform table, to generate a musical tone having high-frequency components containing aliasing noise, when said second sampling frequency is selected as said predetermined sampling frequency.

3. A musical tone-generating method of generating musical tones by reading waveform data from a waveform table and carrying out arithmetic operations on said waveform data read from said waveform table to generate musical tone waveform samples, by the use of a processing unit operating on a software tone generator program the method comprising the steps of:

interpolating said waveform data from said waveform table by a first interpolation method employed when a tone color other than a particular tone color is to be generated from said waveform data read from said waveform table; and interpolating said waveform data from said waveform table by a second interpolation method employed when a musical tone having said particular tone color is to be generated from said waveform data read from said waveform table, to generate a musical tone having high frequency components containing aliasing noise.

4. A musical tone-generating method according to claim 3, wherein said second interpolation method is a two-point interpolation method using a linear function.

5. In a musical tone-generating apparatus having a processing unit operating on a software tone generator program for reading waveform data from a waveform table at a predetermined sampling frequency, and carrying out arithmetic operations on said waveform data read from said waveform table to generate musical tone waveform samples, the improvement wherein:

said processing unit includes first interpolating means for interpolating said waveform data read from said waveform table by a first interpolation method, and second interpolating means for interpolating said waveform data read from said waveform table by a second interpolation method which is lower in accuracy than said first interpolation method; and said musical tone-generating apparatus comprises:

sampling frequency-selecting means for selecting a first sampling frequency or a second sampling frequency lower than said first sampling as said predetermined sampling frequency; and control means for causing said second interpolating means to interpolate said waveform data read from said waveform table, to generate a musical tone having high-frequency components containing aliasing noise, when said second sampling frequency is selected by said sampling frequency-selecting means.

6. In a musical tone-generating apparatus having a processing unit operating on a software tone generator program for reading waveform data from a waveform table at a predetermined sampling frequency, and carrying out arithmetic operations on said waveform data read from said waveform table to generate musical tone waveform samples, the improvement wherein:

said processing unit includes interpolating means for interpolating said waveform data read from said waveform table; and said musical tone-generating apparatus comprises:

sampling frequency-selecting means for selecting a first sampling frequency or a second sampling frequency lower than said first sampling as said predetermined sampling frequency; and interpolation-inhibiting means for inhibiting said interpolating means from interpolating said waveform data read from said waveform table, to generate a musical tone having high-frequency components containing aliasing noise when said second sampling frequency is selected by said sampling frequency-selecting means.

7. A machine readable storage medium-storing instructions to cause a machine to perform a musical tone-generating method of generating musical tones by reading waveform data from a waveform table at a predetermined sampling frequency and carrying out arithmetic operations on said waveform data read from said waveform table to generate musical tone waveform samples, by the use of a processing unit operating on a software tone generator program, the method comprising the steps of:

selecting a first sampling frequency or a second sampling frequency lower than said first sampling frequency as said predetermined sampling frequency; and interpolating said waveform data read from maid waveform table by a second interpolation method which is lower in accuracy than a first interpolation method employed when said first sampling frequency is used, to generate a musical tone having high-frequency components containing aliasing noise, when said second sampling frequency is selected as said predetermined sampling frequency.

* * * * *